United States Patent
Schutten et al.

(10) Patent No.: US 6,178,099 B1
(45) Date of Patent: Jan. 23, 2001

(54) OPTIMAL PHASE-SHIFTED CONTROL FOR A SERIES RESONANT CONVERTER

(75) Inventors: Michael Joseph Schutten, Rotterdam; Vlatko Vlatkovic, Schenectady, both of NY (US); William Frederick Wirth, Johnson Creek, WI (US)

(73) Assignee: General Electric Company, Schenectady, NY (US)

(*) Notice: Under 35 U.S.C. 154(b), the term of this patent shall be extended for 0 days.

(21) Appl. No.: 09/545,449

(22) Filed: Apr. 7, 2000

(51) Int. Cl.[7] .................................................. H02M 3/337
(52) U.S. Cl. ........................................... 363/17; 363/132
(58) Field of Search ................................. 363/16, 17, 98, 363/132

(56) References Cited

U.S. PATENT DOCUMENTS

| Re. 33,866 | 3/1992 | Schutten et al. ......................... 363/17 |
| 5,570,276 | * 10/1996 | Cuk et al. .............................. 363/16 |
| 5,648,705 | * 7/1997 | Sitar et al. ......................... 363/132 X |
| 6,011,708 | * 1/2000 | Doht et al. ........................... 363/132 |

OTHER PUBLICATIONS

"Resonant Power Processors, Part I–State Plane Analysis," Ramesh Oruganti; Fred C. Lee; IEEE Transactions on Industry Applications, vol. IA–21, No. 6, Nov./Dec. 1985, pp. 1453–1460.

"Resonant Power Processors, Part II–Methods of Control," IEEE Transactions on Industry Applications, vol. IA–21, No. 6, Nov./Dec. 1985, pp. 1461–1471.

* cited by examiner

Primary Examiner—Jessica Han
(74) Attorney, Agent, or Firm—Jill M. Breedlove; Douglas E. Stoner (57) ABSTRACT

An optimal phase-shifted control for a series resonant converter involves instantaneous monitoring of state variables (resonant capacitor voltage resonant inductor current and output voltage) and implementation of a control law for providing a quasi-squarewave-with-maximum-coasting (QSWMC) mode of operation. The control law uses the instantaneous resonant inductor current, the instantaneous resonant capacitor voltage and the output voltage to determine the optimal time to perform switching events in order to operate on a desired control trajectory. The QSWMC converter operates at a minimized frequency in a super-resonant mode with zero-voltage switching, minimized electrical stresses, and reduced electromagnetic interference due to nearly sinusoidal resonant tank currents.

10 Claims, 10 Drawing Sheets

Mode 1

Q1, Q4 "On"

$V_{AB} = V_{In}$

$I_{LR} > 0$ $V_{Tank} = V_{In} - V_{Out}/N$

Circuit Configuration

FIG. 2B

Equivalent Circuit

FIG. 3A

Mode | Circuit Configuration

Mode 2

D2, Q4 "On"

$V_{AB} = 0$

$I_{LR} > 0$ $V_{Tank} = -V_{Out}/N$

FIG. 3B

Equivalent Circuit

FIG. 4A

Mode | Circuit Configuration

Mode 3

Q2, Q3 "On"

$V_{AB} = -V_{In}$ $I_{LR} < 0$

$V_{Tank} = -V_{In} + V_{Out}/N$

FIG. 4B

Equivalent Circuit

FIG. 5A

Mode | Circuit Configuration

Mode 4
D1, Q3 "On"
$V_{AB} = 0$
$I_{Lr} < 0$
$V_{Tank} = +V_{Out}/N$

FIG. 5B

Equivalent Circuit

FIG. 6A  Mode 1: Q1, Q4 on

FIG. 6B  Mode 2: D2, Q4 on

FIG. 6C  Mode 3: Q2, Q3 on

FIG. 6D  Mode 4: D1, Q3 on

OPTIMAL PHASE-SHIFTED CONTROL FOR A SERIES RESONANT CONVERTER

BACKGROUND OF THE INVENTION

The present invention relates generally to resonant power converters and, more particularly, to a series resonant converter controlled to operate in a super-resonant switching mode in order to achieve zero-voltage switching under all operating conditions.

Classical optimal control involves operating a full-bridge switching converter in a full square wave mode of operation. That is, both diagonal pairs of switching devices are switched on and off simultaneously. Unfortunately, classical optimal control results in higher than desirable switching losses and less than desirable dynamic performance for some applications. For example, for x-ray generation, classical optimal control does not meet strict performance criteria. Such criteria include the following: a fast generator voltage rise time in order to avoid an excess radiation dose to patients; minimal generator voltage ripple in order to avoid imaging jitter problems; avoidance of voltage overshoots which would create an additional radiation dose to patients; high audiosusceptibility, or line voltage ripple rejection, to avoid jitter and to ensure a tightly regulated output; independence of generator with respect to line voltage variations for consistent imaging performance; maintenance of a constant output voltage for high-quality successive images; reduction of high frequency currents flowing from the power converter back into the dc bus capacitors; and compliance with electromagnetic interference regulations.

Accordingly, it is desirable to provide a control for a series resonant converter which results in a very fast response time while maintaining zero-voltage switching operation. It is furthermore desirable that such a control meet strict performance criteria such as those set forth hereinabove.

BRIEF SUMMARY OF THE INVENTION

An optimal phase-shifted control for a series resonant converter comprises an instantaneous monitoring of state variables (resonant capacitor voltage, resonant inductor current and dc output voltage) and implementation of a control law for providing a quasi-squarewave-with-maximum-coasting (QSWMC) mode of operation. The control law uses the instantaneous resonant inductor current, the instantaneous resonant capacitor voltage and the dc output voltage to determine the optimal switching events in order to operate on a desired control trajectory. QSWMC operation for optimal phase-shifted control comprises a repetitive set of four forcing functions across the resonant tank circuit and thus four repetitive switching modes. The QSWMC converter operates at a minimized frequency in a super-resonant mode (i.e., above the resonant tank frequency) with zero-voltage switching, minimized electrical stresses, and reduced electromagnetic interference due to nearly sinusoidal resonant tank currents.

DETAILED DESCRIPTION OF THE INVENTION

Figure 1:
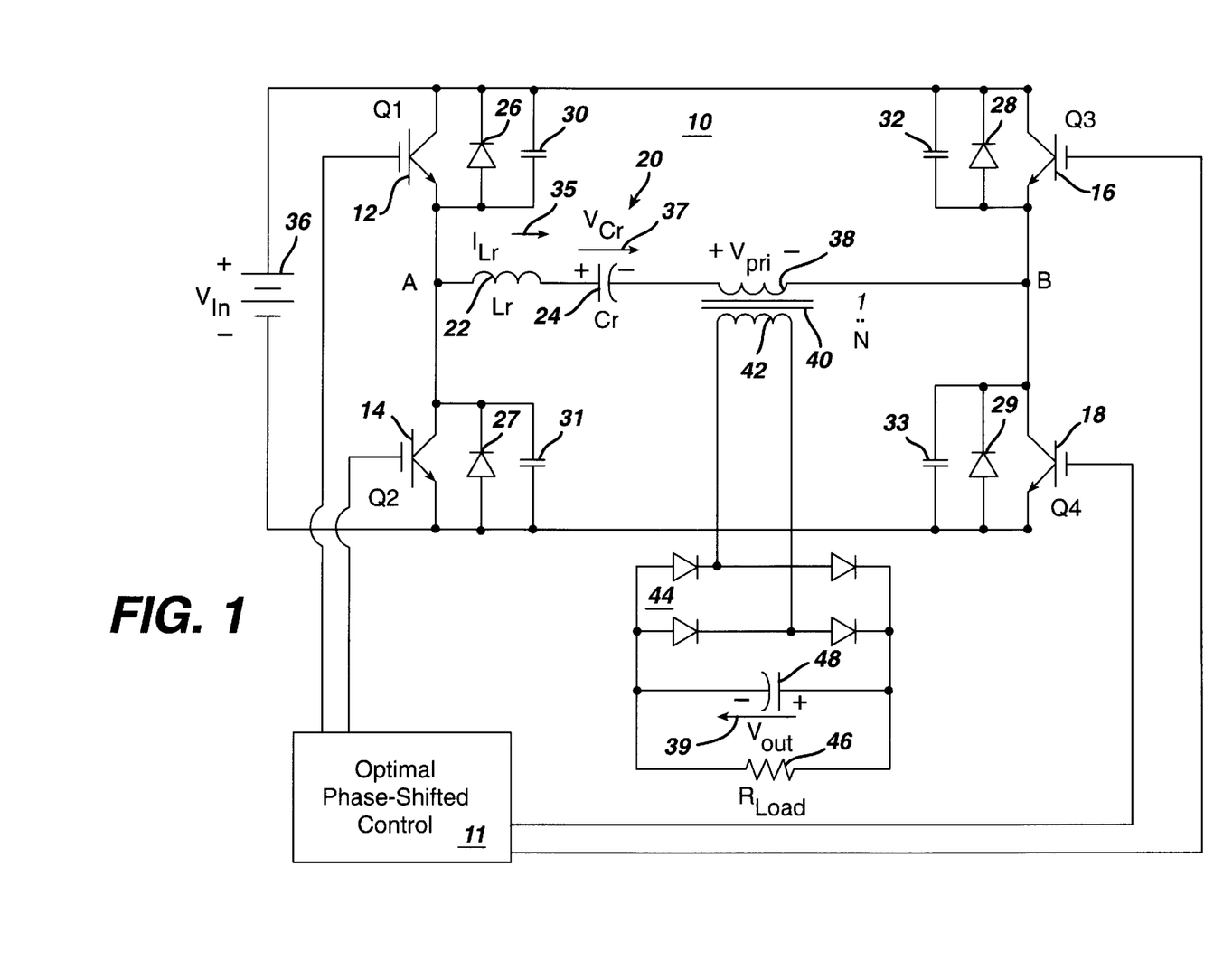
FIG. 1 schematically illustrates an exemplary series resonant power converter to which optimal phase-shifted control according to the invention is applicable.

FIG. 1 illustrates an exemplary series resonant converter 10 to which optimal phase-shifted control 11 according to the present invention is applicable. Converter 10 comprises a full-bridge configuration having switching devices 12 (Q1) and 14 (Q2) connected in series in one converter phase leg and switching devices 16 (Q3) and 18 (Q4) connected in series in the other converter phase leg. A resonant tank circuit 20, comprising a series combination of a resonant inductor 22 (Lr) and resonant capacitor 24 (Cr), is connected in series with a transformer primary winding 38 between nodes A and B joining the switching devices in each converter phase leg. FIG. 1 shows anti-parallel diodes 26–29, respectively, coupled across switching devices 12, 14, 16 and 18, respectively. A snubber capacitor 30–33, respectively, is also shown as being coupled across each switching device 12, 14, 16 and 18, respectively. A dc input voltage 36 is connected across the full-bridge. The primary winding 38 of an isolation transformer 40 is connected in series with the resonant tank circuit 22 and 24. A secondary winding 42 of transformer 40 is coupled to a full-bridge rectifier 44 which is coupled across the illustrated parallel combination of an output capacitance 48 and an electrical load 46.

For purposes of analysis of the optimal phase-shifted control algorithm described herein, the switching devices are assumed to be ideal, i.e., having no forward voltage drop and an instantaneous turn-on and turn-off. Exemplary suitable switching devices include insulated gate bipolar transistors, metal oxide semiconductor field effect transistors, and bipolar transistors. Advantageously, with this optimal phase-shifted control algorithm, each of the switching devices can be turned on and off independently of the other switching devices, the only limitation being that two switching devices in each respective phase leg cannot be turned on simultaneously in order to avoid destructive shoot-through.

One phase leg operates as the controlled leg which modulates to regulate the output voltage. This phase leg is also referred to herein as the leading phase leg because this is the phase leg which initially changes its switching state during a switching cycle. The other phase leg is referred to herein as the lagging phase leg. The switching devices in the lagging phase leg are controlled to switch at (or slightly before) the natural current zero crossing of the resonant circuit. The phase-shifted optimal control forces the series resonant converter to operate at a frequency higher than the natural frequency of the resonant tank components ($L_R$, $C_R$). This super-resonant mode of operation has no turn-on switching losses. The simple capacitor snubbers 30–33 comprise a lossless turn-off snubber. (The capacitor snubbers 32 and 34 for the lagging phase leg can alternatively be omitted, if desired, since the switching loss for this leg is very low.) The main switching devices Q1–Q4 have significantly reduced switching losses as compared to their hard-switched counterparts. In addition, there are reduced electrical stresses and reduced electromagnetic interference (EMI) due to the nearly sinusoidal resonant tank currents.

This optimal phase-shifted control comprises an instantaneous monitoring of state variables (resonant capacitor voltage, resonant inductor current and output voltage) of the converter and implementation of a control law for providing a quasi-squarewave-with-maximum-coasting (QSWMC) mode of operation. As represented in FIG. 1, monitoring of resonant inductor current $I_{Lr}$ is accomplished using any suitable current sensing technique, as indicated by a reference numeral 35; and monitoring of resonant capacitor voltage $V_{Cr}$ and monitoring of the output voltage $V_{out}$ are accomplished using any suitable voltage sensing technique, as indicated by the reference numerals 37 and 39, respectively.

There are four repeated operating modes of operation for the series resonant converter using the QSWMC approach for optimal phase-shifted control. FIGS. 2A, 3A, 4A and 5A illustrate the four operating modes, respectively; and FIGS. 2B, 3B, 4B and 5B, respectively, illustrate the corresponding equivalent circuits therefor. The bold lines indicate the paths of current flow in each mode. The voltage across nodes A and B is either $+V_{In}$, $-V_{In}$, or zero, depending upon which combination of transistors and diodes in each phase leg is conducting.

The four-mode squarewave control can be viewed as an L-C resonant tank with a repetitive set of forcing functions. The $V_{Cr}$-$Z_0 I_{Lr}$ state plane trajectory is a circle with its center at the forcing function voltage. Different initial conditions ($V_{CR}[0]$, $I_{LR}[0]$) change the angular location on the radial arc, but not the center of the state plane trajectory.

The solutions for the resonant capacitor voltage and resonant inductor currents are:

$$V_{CR}(t) = V_F\left(1 - \cos\left(\frac{t}{\sqrt{L_R C_R}}\right)\right) \qquad \text{Eqn. 1}$$

$$I_{LR}(t) = \frac{V_F}{\sqrt{\frac{L_R}{C_R}}} \sin\left(\frac{t}{L_R C_R}\right) \qquad \text{Eqn. 2}$$

$V_F$ is the forcing voltage for each of the four different operating modes. The solutions to equations 1 and 2 are circles when drawn in a $V_{CR}$-$Z_0 I_{LR}$ state plane, where $Z_0$ is the characteristic impedance of the resonant tank, $$\sqrt{\frac{L_R}{C_R}}.$$

Figure 2A:
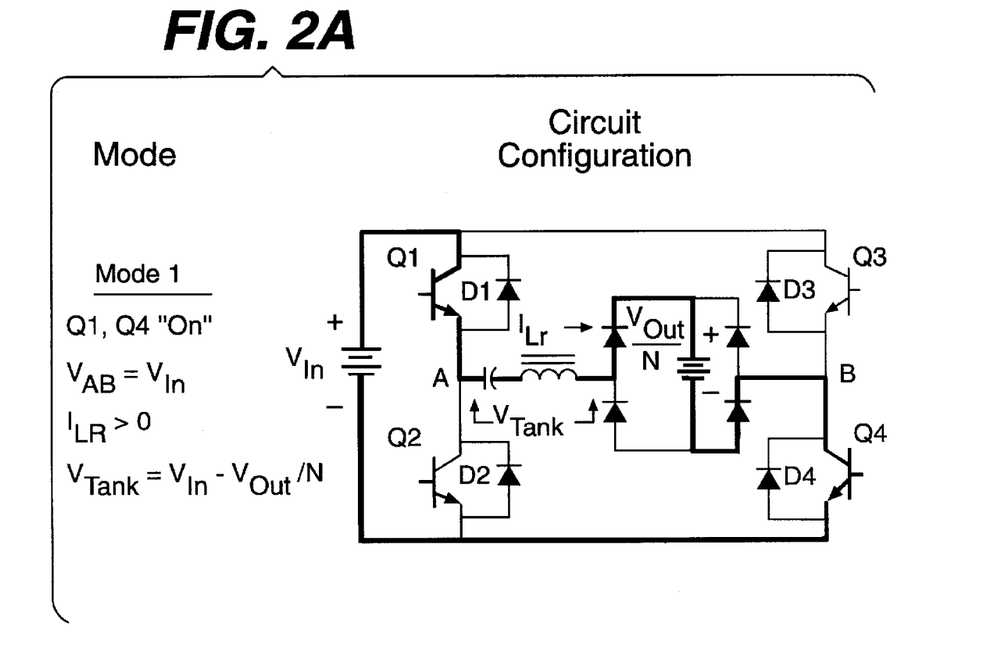
FIGS. 2A, 3A, 4A and 5A, respectively, schematically illustrate the four operating modes of QSWMC for the exemplary circuit of FIG. 1.
Figure 2B:
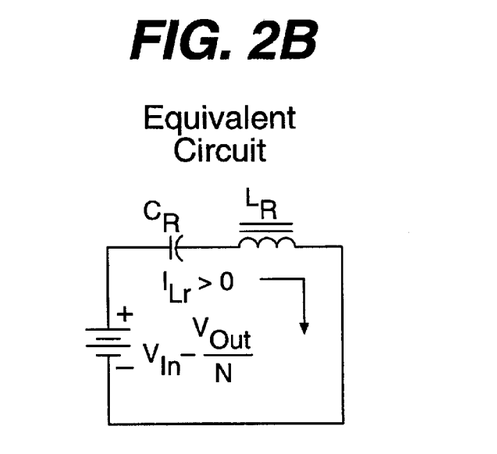
FIGS. 2B, 3B, 4B and 5B, respectively, illustrate the equivalent circuits therefor.

As illustrated in FIGS. 2A and 2B, in the first mode, switching devices Q1 and Q4 are on; the voltage $V_{AB}$ is equal to the dc supply voltage $V_{in}$; the resonant tank voltage $V_{tank}$ (i.e., across the resonant capacitance and resonant inductance) is given by: $V_{tank} = V_{in} - V_{out}/N$, where N represents the transformer turns ratio; and the resonant current flows in the direction shown.

Figure 3A:
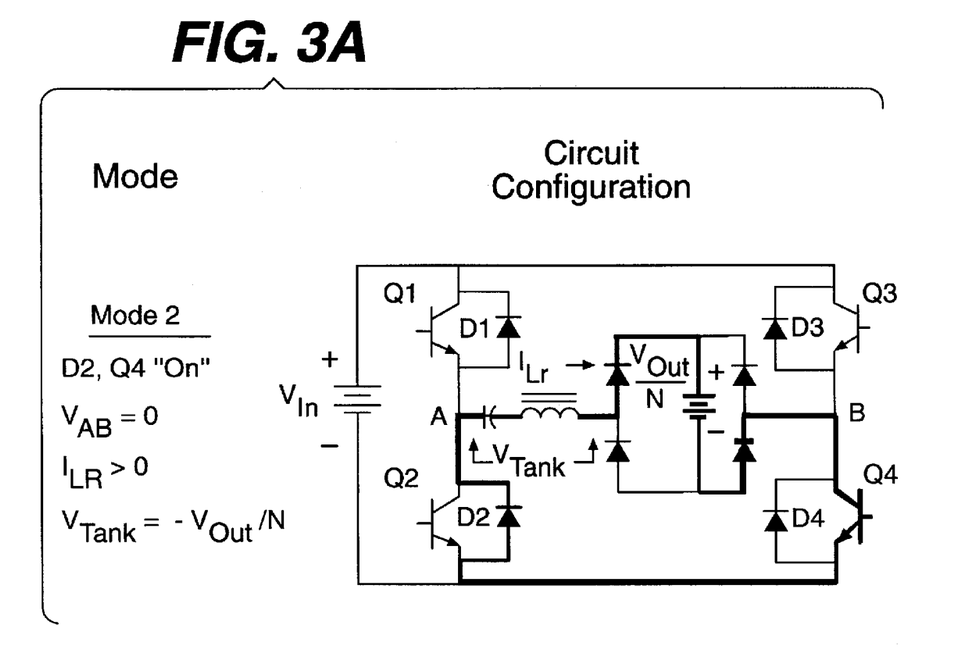
Figure 3B:
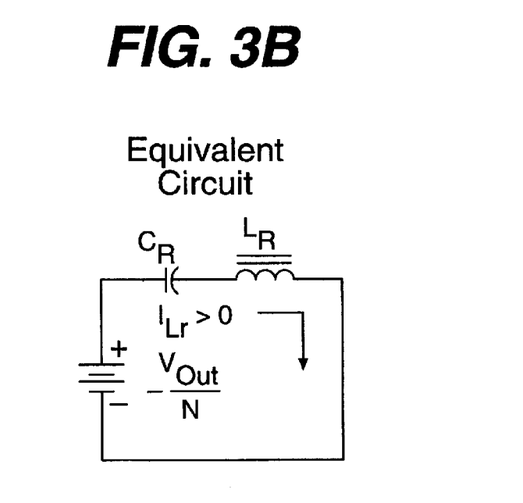

In the second mode, as illustrated in FIGS. 3A and 3B, devices D2 and Q4 are conducting; the voltage $V_{AB}$ is equal to zero; and the resonant tank voltage $V_{tank}$ is given by: $V_{tank} = -V_{out}/N$.

Figure 4A:
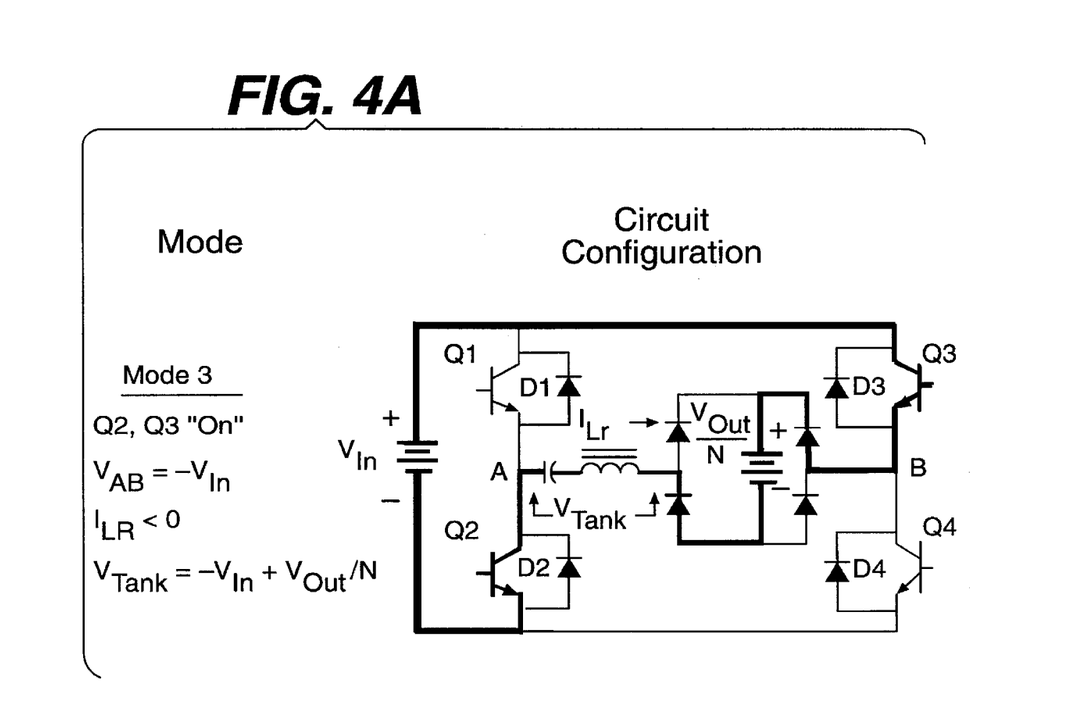
Figure 4B:
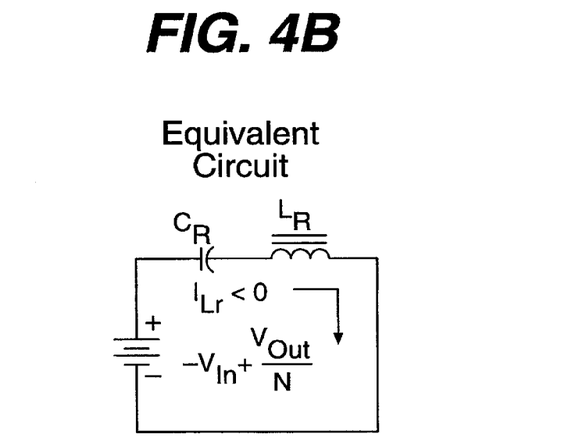

In the third mode, as illustrated in FIGS. 4A and 4B, devices Q2 and Q3 are on; the voltage $V_{AB}$ is equal to $-V_{in}$; and the resonant tank voltage $V_{tank}$ is given by: $V_{tank} = -V_{in} + V_{out}/N$. The resonant current reverses direction as shown.

Figure 5A:
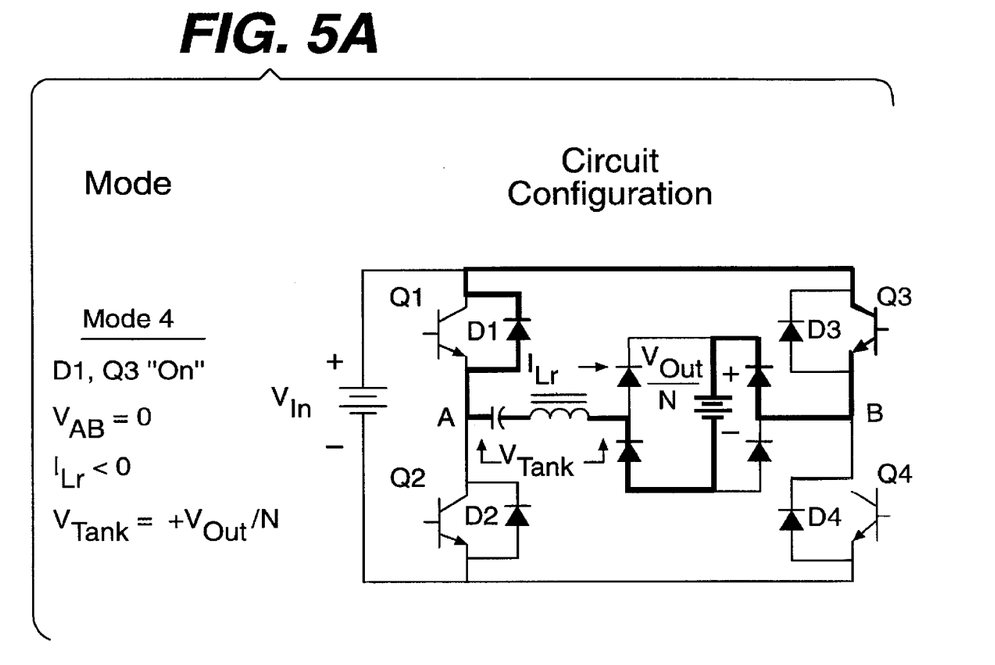
Figure 5B:
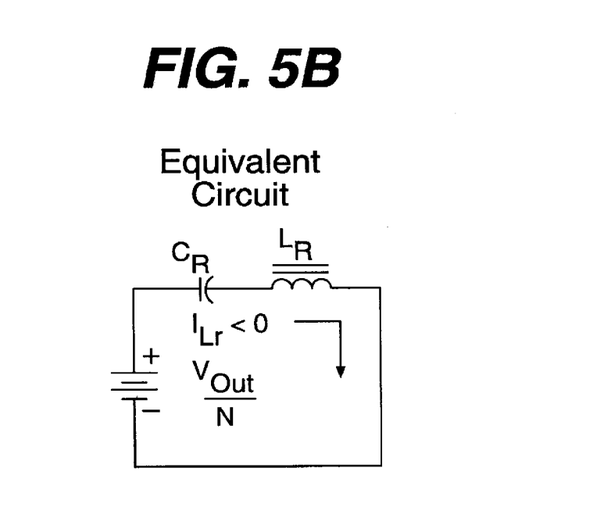
Figure 6A:
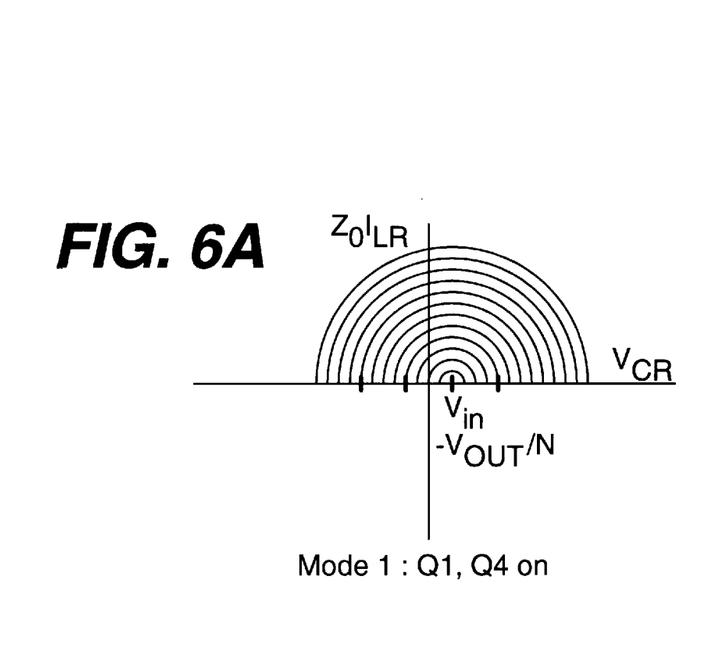
FIGS. 6A–6D, respectively, illustrate state diagrams corresponding to the operating modes of FIGS. 2A–5A, respectively.
Figure 6B:
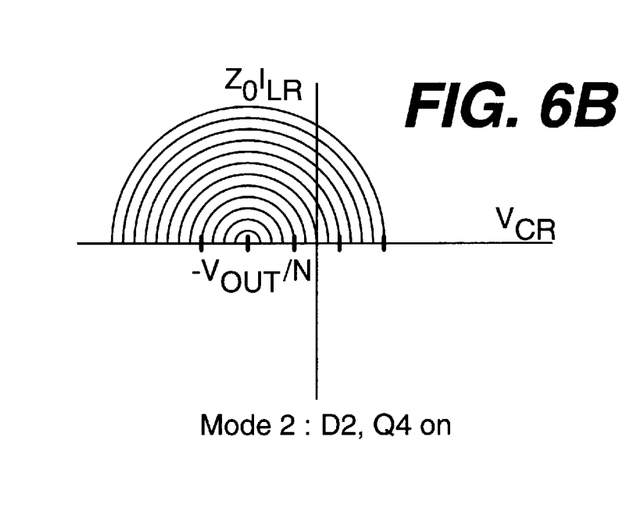
Figure 6C:
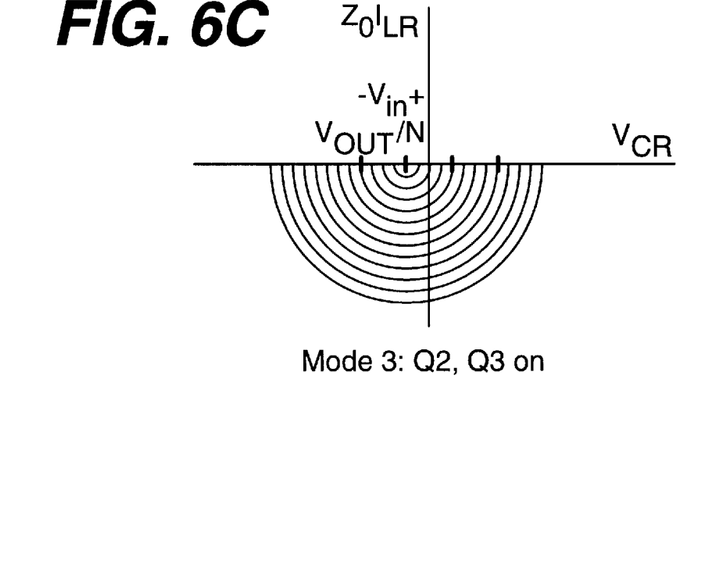
Figure 6D:
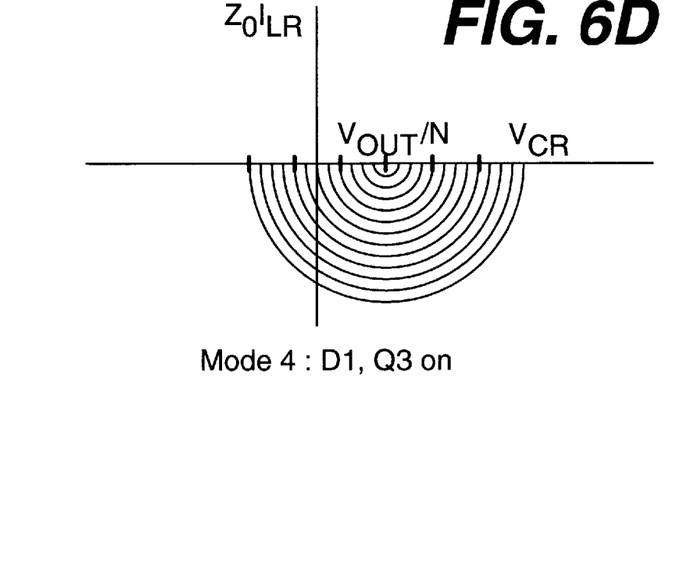

In the fourth mode, as illustrated in FIGS. 5A and 5B, devices D1 and Q3 are on; the voltage $V_{AB}$ is equal to zero; and the resonant tank voltage $V_{tank}$ is given by: $V_{tank} = +V_{out}/N$.

As illustrated in FIGS. 6A–6D, each of the four modes are respectively represented by four sets of circles in the state plane, the centers of which are located at the appropriate forcing voltage. The radii correspond to the specific initial conditions on the resonant components. Increasing time corresponds to subtending the curves in a clockwise direction. Operation at a steady state operating condition corresponds to clockwise subtending each of the four operating modes and appropriately transitioning between one operating mode and another. The operating modes operate on a symmetrical trajectory in the state plane. This optimal phase-shifted control approach removes the high frequency dynamics associated with the resonant tank components.

Figure 7:
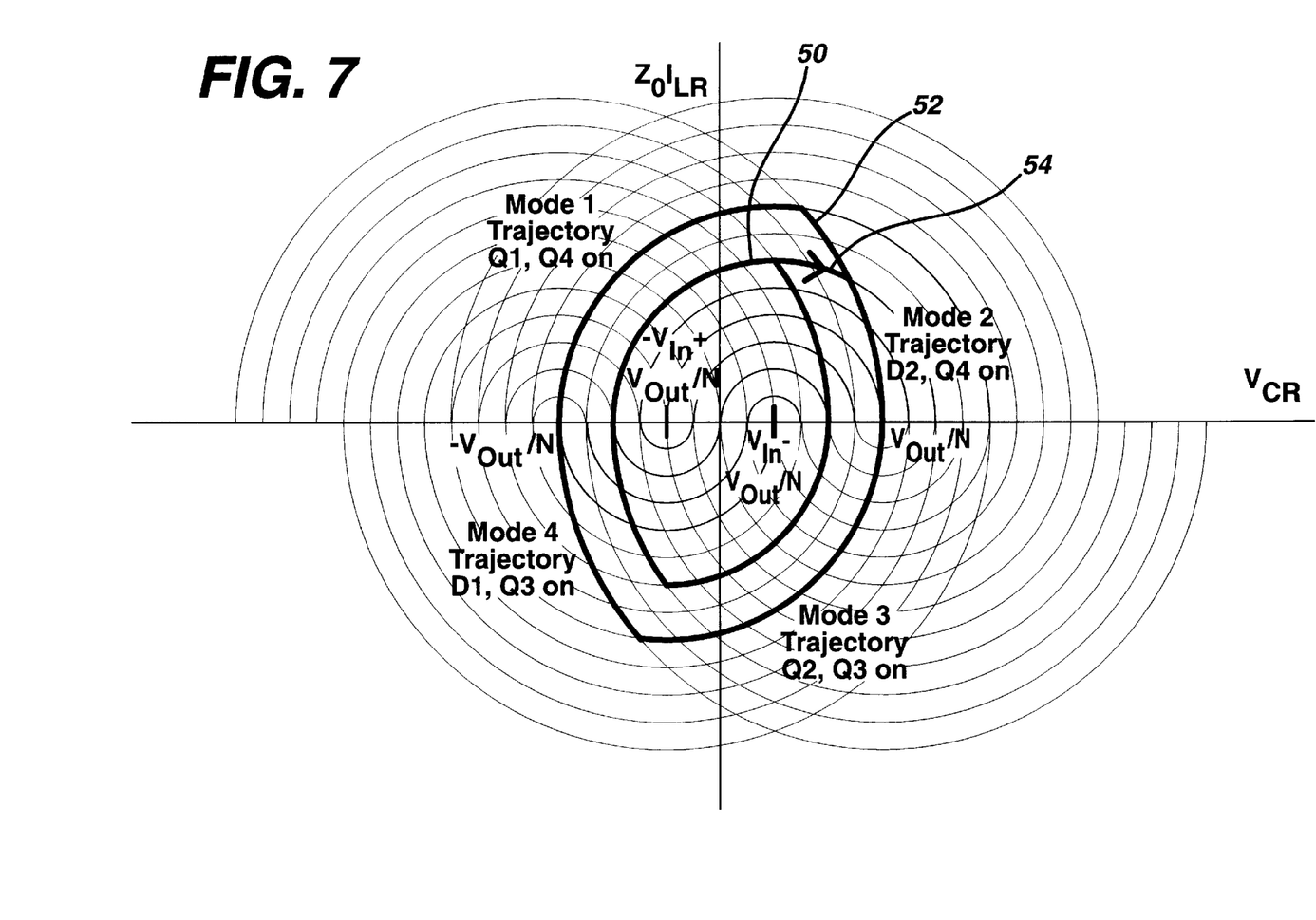
FIG. 7 graphically illustrates two possible state plane trajectories corresponding to the four modes of FIGS. 6A–6D, respectively, and a transition between the two trajectories.

FIG. 7 shows two steady-state trajectories 50 and 52, and the time optimal switching condition 54 to transition between the trajectories. In particular, the optimal phase-shifted control trajectories transition between operating conditions in the time optimal manner for the QSWMC operating modes. In this case, transitioning between steady-state trajectory 50 and steady-state trajectory 52 is accomplished by extending the operating time in Mode 1 until it reaches the new trajectory. Larger-size trajectories correspond to increasing load currents and operation closer to the resonant frequency.

The control law for phase-shifted optimal control uses the instantaneous inductor current $I_{Lr}$ and instantaneous resonant capacitor voltage $V_{Cr}$ to determine the optimal time to perform switching events, i.e., turning on and off switching devices Q1–Q4. The desired control trajectory is determined by the control law as described hereinbelow.

The control law employs calculation of an instantaneous distance squared function. This distance calculation is from the point ($-V_{out}/N,0$) when $I_{Lr}$ is positive, and from ($V_{out}/N,0$) when $I_{Lr}$ is negative. This radius-squared value is continuously calculated using the control law as follows:

$$\text{RADIUS}^2_{CONTROL} - V_{CONTROL} \leq 0 \qquad \text{Eqn.3}$$

where $$\text{RADIUS}^2_{CONTROL} = (Z_0 * I_{Lr})^2 + (V_{Cr} + V_{out}/N)^2 \text{ for } I_{Lr} > 0 \qquad \text{Eqn.4}$$

$$\text{RADIUS}^2_{CONTROL} = (Z_0 * I_{Lr})^2 + (V_{Cr} - V_{out}/N)^2 \text{ for } I_{Lr} < 0 \qquad \text{Eqn.5}$$

Figure 8:
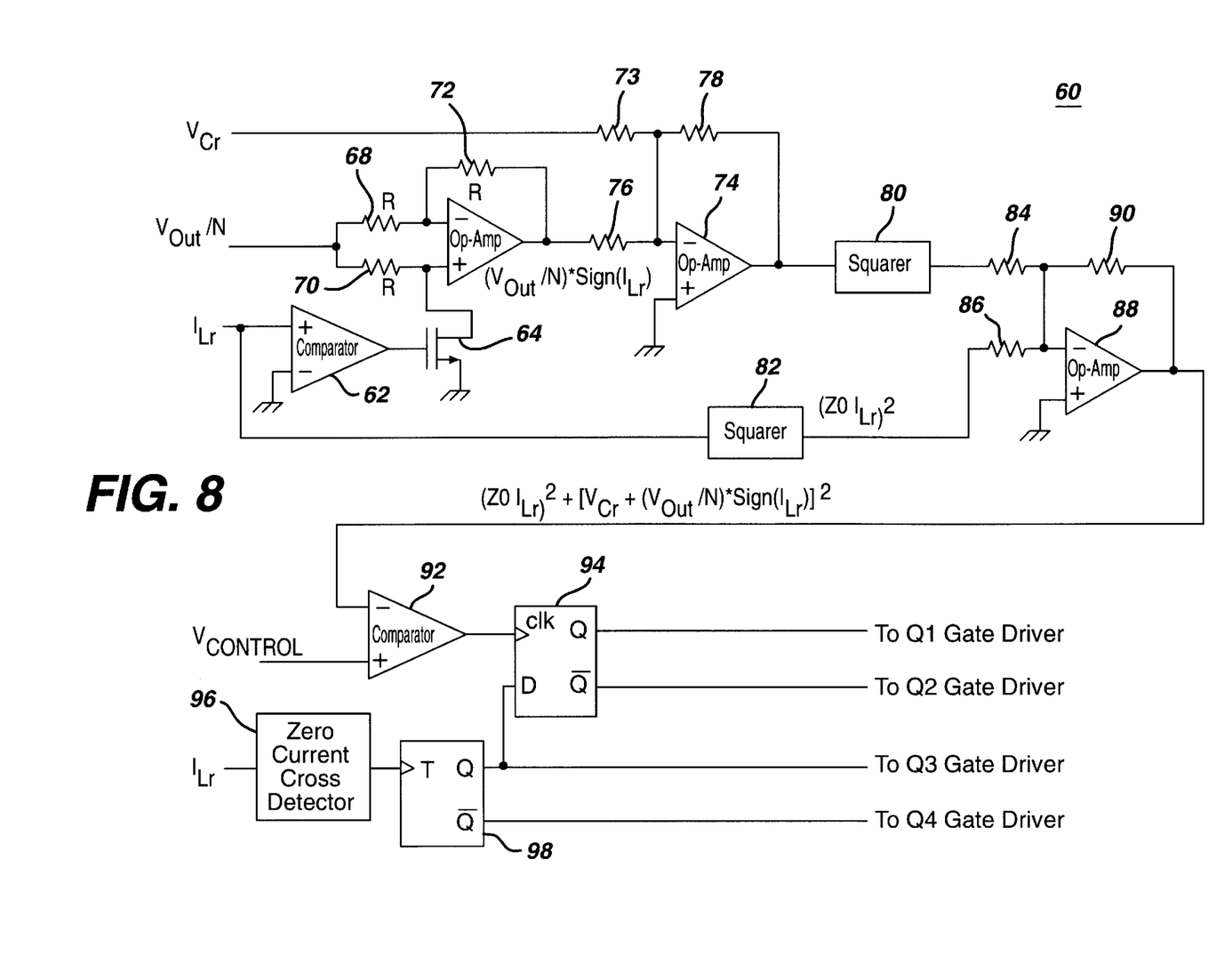
FIG. 8 is a block diagram illustrating an exemplary embodiment of phase-shifted optimal control according to the present invention.

FIG. 8 is a block diagram representing an exemplary implementation 60 of phase-shifted optimal control 11 in accordance with a preferred embodiment of the present invention. The monitored resonant inductor current $I_{Lr}$ is provided as an input to the non-inverting input of a comparator 62. The inverting input is shown as being referenced to ground. The output of comparator 62 is provided to a switching device 64, the drain of which is shown as being provided to the non-inverting input of an operational amplifier 66. The value $V_{out}/N$ is provided to each input of the operational amplifier through a resistor 68 and 70, respectively, each having the value R. The operational amplifier also has a feedback resistor 72, also shown as having the value R. The monitored resonant capacitor voltage $V_{Cr}$ is provided through a resistor 73 to the inverting input of another operational amplifier 74. The output of operational amplifier 66 is also provided through a resistor 76 to the inverting input of operational amplifier 74 which has a feedback resistor 78. The output of operational amplifier 74 is provided to a squarer 80. The resonant inductor current $I_{Lr}$ is provided to a squarer 82. The outputs of squarers 80 and 82 are provided through resistors 84 and 86, respectively, to the inverting input of an operational amplifier 88 having a feedback resistor 90. The output of operational amplifier 88 is provided to the inverting input of a comparator 92. A control voltage $V_{control}$ is provided to the non-inverting input of comparator 92. The output is provided to a clocked D flip-flop 94, the outputs of which are provided to the gate drivers (not shown) for switching devices Q1 and Q2. The resonant inductor current $I_{Lr}$ is provided to a zero-crossing detector 96, the output of which is provided to a T flip-flop 98. The outputs of flip-flop 98 are provided to the gate drivers (not shown) for switching devices Q3 and Q4. The D output of flip-flop 94 is tied to the Q output of flip-flop 98 to properly synchronize the control circuit.

Figure 9:
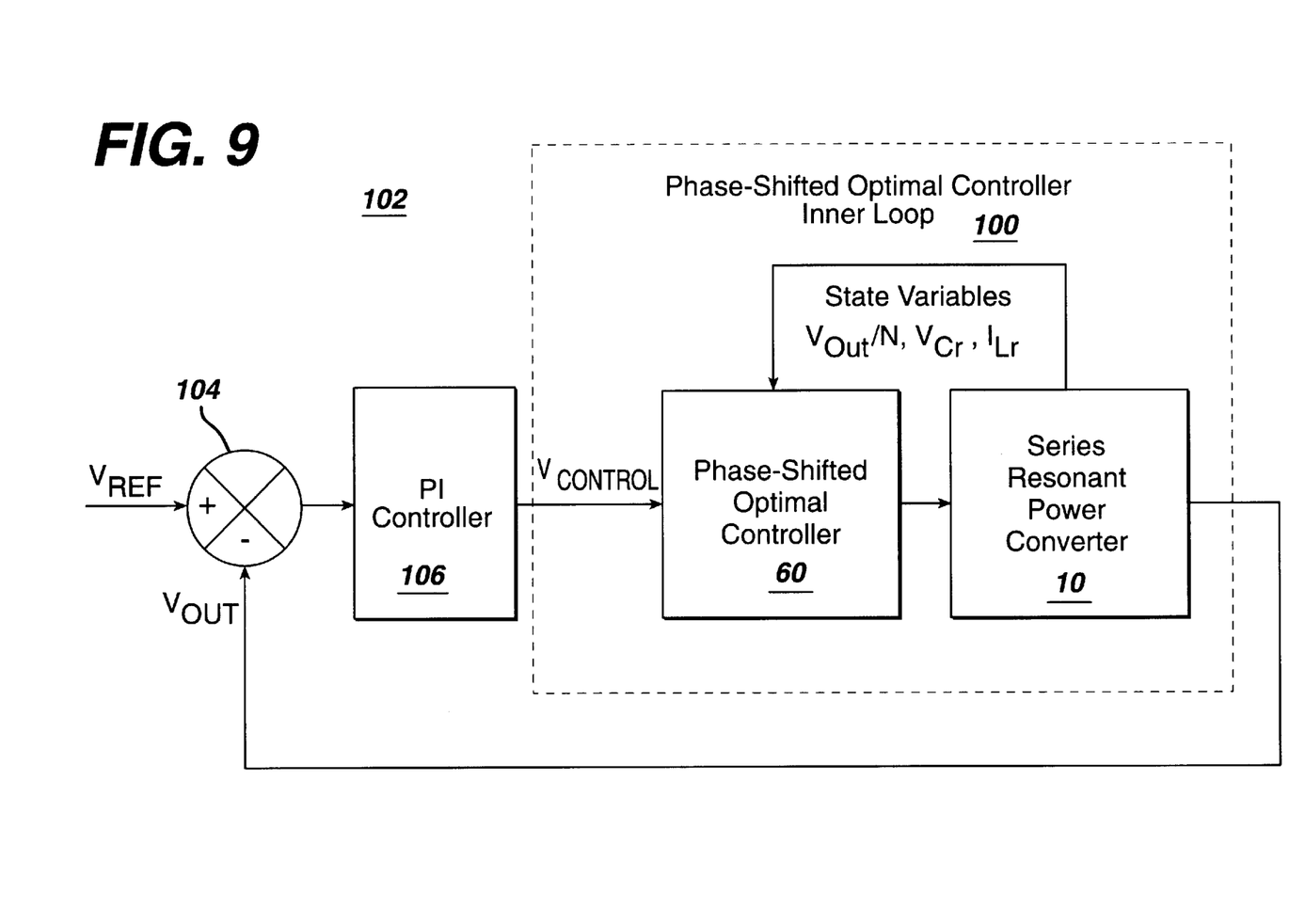
FIG. 9 is a block diagram illustrating a closed-loop proportional-integral (PI) controller with an optimal phase-shifted control inner loop according to a preferred embodiment of the present invention.

FIG. 9 shows an implementation of a phase-shifted optimal controller (such as that represented by block diagram 60 of FIG. 8) as part of an inner control loop 100 in a closed-loop proportional-integral (PI) controller 102. In particular, the PI controller comprises a summer 104 and a PI controller block 106. The summer provides the difference between a reference voltage $V_{ref}$ and the feedback $V_{out}$ from the inner loop 100. The output of PI controller block 106 is the input control voltage $V_{control}$ to the phase-shifted optimal controller inner loop 100.

Figure 10:
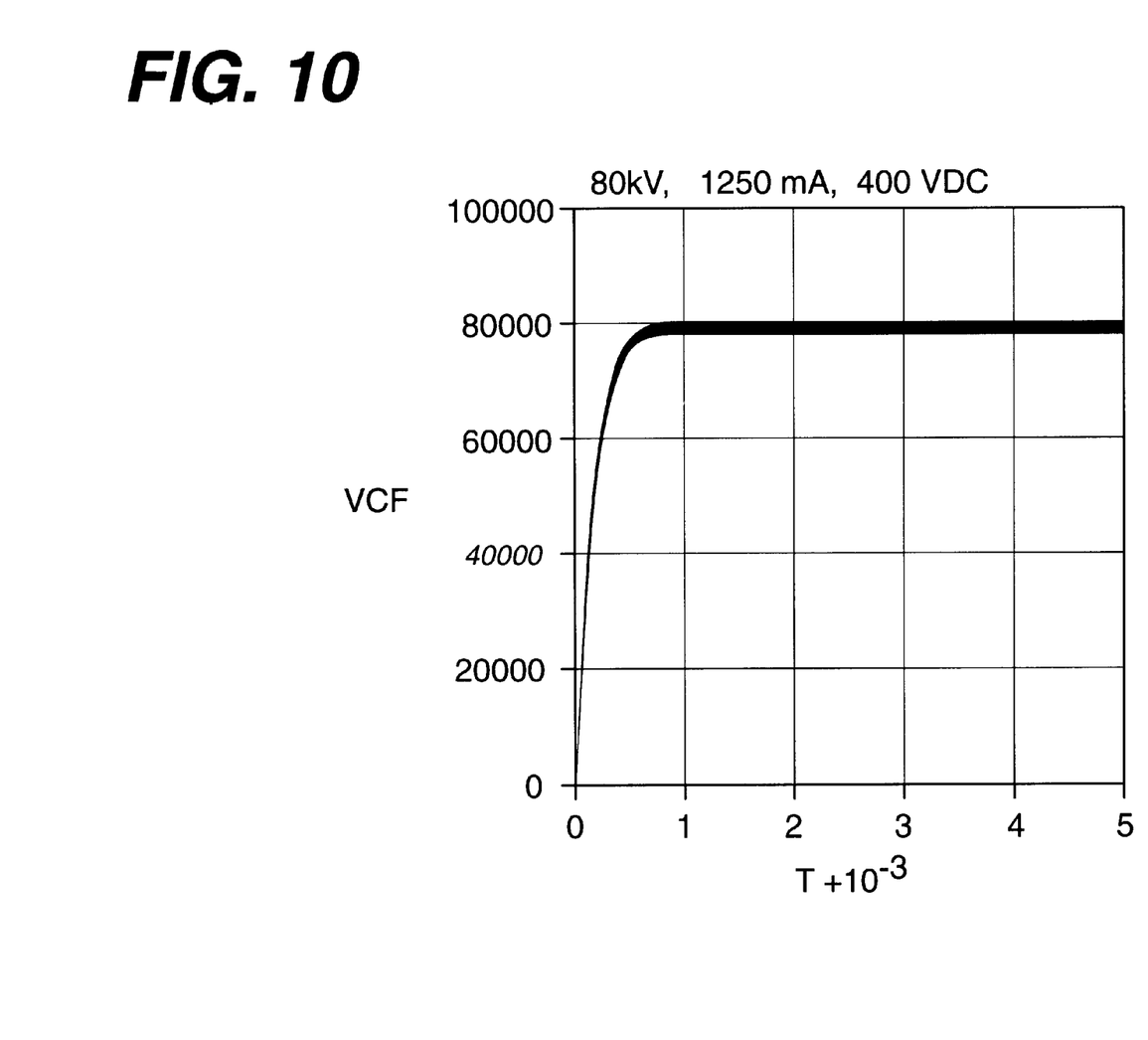
FIG. 10 graphically illustrates fast voltage rise time, without overshoot, using the control approach illustrated in FIG. 9.

FIG. 10 shows the series-resonant power converter fast voltage rise time, without overshoot, using the control approach shown in FIG. 9.

Advantageously, the optimal phase-shifted control algorithm described herein provides a very fast responding power converter, while maintaining zero-voltage switching operation. This provides fast voltage rise times and rapid transitions from one DC operating condition to other DC operating conditions.

As another advantage, with QSWMC, no current is re-circulated back to the input voltage source ($V_{In}$). In addition, the lagging switching devices turn off at a simultaneous zero-voltage and zero-current condition, such that the switching losses for these devices are very low.

The phase-shifted optimal control circuit has excellent intrinsic electromagnetic interference characteristics. The input voltage, shown at 36 of FIG. 1, is typically created from a rectified AC voltage source. This causes the input voltage Vin to have a 120 Hz component of ripple for a 60 Hz power source. When the phase-shifted optimal control circuitry operates with the AC input voltage ripple component, it has the effect of moving around, or dithering, the switching frequency of the series resonant power converter. This is because the phase-shifted optimal controller is regulating the energy in the resonant tank to operate on the correct switching trajectory. For Modes 1 and 3 (see FIG. 7), the input voltage is one component of the driving voltage across the resonant tank, or alternatively the "centers" for this region of subtending arcs. These centers are thus also modulating at a 120 Hz rate. This has the effect of modulating between trajectories at a 120 Hz rate, thereby modulating the switching frequency of the series resonant converter. The result is to create a spread spectrum of switching frequencies, and hence a spread-spectrum of high frequency currents drawn from the input voltage bus, and a spread spectrum of currents flowing through the resonant tank. As a result, the magnitude of current from a single large component at a fixed frequency is reduced to a much lower level of current modulated around the same frequency. The conducted and radiated EMI are reduced, and compliance with EMI conducted and radiated regulations is easier.

As another advantage, the converter in QSWMC operates at the minimum possible frequency while maintaining zero-voltage switching. The optimal phase-shifted control algorithm ensures operation in a super-resonant manner, i.e., at a frequency above the tank resonant frequency. Thus, the switching frequency is lower (for same kV, mA) than for either full squarewave or quasi-squarewave operation. The lower frequency of operation further reduces the switching losses.

The lagging phase leg (Q3–Q4) turns on and off with both a zero-voltage and zero-current condition, thus having no turn-on or turn-off losses. However, the semiconductor devices in this phase leg conduct a larger rms current, and thus have higher conduction losses.

The leading phase leg (Q1–Q2) operates in a zero-voltage switching manner. Hence, there are no turn-on losses, but still some turn-off losses. The switching devices in this phase leg conduct current for less time than those of the lagging phase leg, and thus have lower conduction losses.

Still another advantage of optimal phase-shifted control is an inherent audiosusceptibility improvement ($\Delta v_{out}/\Delta v_{in}$) due to the inherent feedback mechanism resulting from monitoring the state variables.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An optimal phase-shifted control for a resonant converter of a type comprising a full-bridge configuration of switching devices, a resonant tank circuit and an isolation transformer, the resonant tank circuit comprising a resonant inductance and a resonant capacitance, the optimal phase-shifted control comprising:

means for monitoring resonant inductance current, resonant capacitance voltage and an output voltage; and means for operating the resonant converter at a super-resonant frequency and for implementing a control law for operating the resonant converter in a quasi-squarewave-with-maximum-coasting (QSWMC) mode such that operation proceeds along predetermined state trajectories with transitions therebetween determined by the control law in order to provide optimal turn on and turn off times for the switching devices, each state trajectory having a center determined by a forcing function voltage and a radius determined by the resonant inductance current and the resonant capacitance voltage.

2. The control of claim 1 wherein the control law is represented as:

$$\text{RADIUS}^2_{CONTROL} = (Z_0 * I_{Lr})^2 + (V_{Cr} + V_{out}/N)^2 \text{ for } I_{Lr} > 0$$
$$\text{RADIUS}^2_{CONTROL} = (Z_0 * I_{Lr})^2 + (V_{Cr} - V_{out}/N)^2 \text{ for } I_{Lr} < 0$$

where $Z_0$ is the characteristic impedance of the resonant tank circuit, $I_{L_r}$ is the resonant inductance current, $V_{C_r}$ is the resonant capacitance voltage, $V_{out}$ is the output voltage, N is the transformer turns ratio, and RADIUS is the radius of the respective state trajectory.

3. The control of claim 1, further comprising:

a zero crossing detector for determining zero crossings of the resonant inductance current; and logic circuitry for providing signals for switching on the lagging switching device in each respective phase leg at or slightly before the zero crossings of the resonant inductance current.

4. An optimal phase-shifted control for a resonant converter of a type comprising a full-bridge configuration of switching devices, a resonant tank circuit and an isolation transformer, the resonant tank circuit comprising a resonant inductance and a resonant capacitance, the optimal phase-shifted control comprising:

control law circuitry for providing a control law expression represented as $$(Z_0 * I_{Lr})^2 + [V_{Cr} + (V_{out}/N) * \text{Sign}(I_{Lr})]^2$$

where $Z_0$ is the characteristic impedance of the resonant tank circuit, $I_{L_r}$ is the resonant inductance current, $V_{C_r}$ is the resonant capacitance voltage, $V_{out}$ is the output voltage, N is the transformer turns ratio;

a comparator for comparing the control law expression with a predetermined control voltage;

a zero crossing detector for determining zero crossings of the resonant inductance current; and logic circuitry for receiving output signals from the comparator and the zero-crossing detector and for providing signals based thereon for switching on the lagging switching device in each respective phase leg at or slightly before the zero crossings of the resonant inductance current, such that operation proceeds along predetermined state trajectories with transitions therebetween determined by the control law expression in order to provide optimal turn on and turn off times for the switching devices, each state trajectory having a center determined by a forcing function voltage and a radius determined by the resonant inductance current and the resonant capacitance voltage.

5. The optimal control of claim 4 wherein the resonant converter operates in a super-resonant frequency mode.

6. The optimal control of claim 4 wherein the resonant converter operates in a quasi-squarewave-with-maximum-coasting (QSWMC) mode.

7. A method for optimal phase-shifted control for a resonant converter of a type comprising a full-bridge configuration of switching devices, a resonant tank circuit and an isolation transformer, the resonant tank circuit comprising a resonant inductance and a resonant capacitance, the method comprising:

monitoring resonant inductance current, resonant capacitance voltage and an output voltage; and implementing a control law using the resonant inductance current, resonant capacitance voltage and an output voltage for operating the resonant converter in a super-resonant quasi-squarewave-with-maximum-coasting (QSWMC) mode such that operation proceeds along predetermined state trajectories with transitions therebetween determined by the control law in order to provide optimal turn on and turn off times for the switching devices, each state trajectory having a center determined by a forcing function voltage and a radius determined by the resonant inductance current and the resonant capacitance voltage.

8. The method of claim 7, further comprising:

determining zero crossings of the resonant inductance current; and providing signals for switching on the lagging switching device in each respective phase leg at or slightly before the zero crossings of the resonant inductance current.

9. The method of claim 7 wherein the step of implementing further comprises operating the resonant converter at a super-resonant frequency.

10. The method of claim 7 wherein the step of implementing further comprises operating the resonant converter in a quasi-squarewave-with-maximum-coasting (QSWMC) mode.

* * * * *